United States Patent
Liu et al.

(10) Patent No.: US 11,917,340 B2
(45) Date of Patent: Feb. 27, 2024

(54) PROJECTION DEVICE AND BRIGHTNESS CONTROL METHOD THEREOF

(71) Applicant: Coretronic Corporation, Hsin-Chu (TW)

(72) Inventors: Chi-Fu Liu, Hsin-chu (TW);
Tsung-Hsin Liao, Hsin-Chu (TW);
Chun-Li Chen, Hsinchu (TW);
Hung-Yu Lin, Hsin-chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 17/703,966

(22) Filed: Mar. 24, 2022

(65) Prior Publication Data

US 2022/0337793 A1 Oct. 20, 2022

(30) Foreign Application Priority Data

Apr. 14, 2021 (CN) .......................... 202110398054.8

(51) Int. Cl.
*H04N 9/31* (2006.01)
*H04N 9/68* (2023.01)

(52) U.S. Cl.
CPC ........... *H04N 9/3155* (2013.01); *H04N 9/312* (2013.01); *H04N 9/3164* (2013.01); *H04N 9/68* (2013.01)

(58) Field of Classification Search
CPC .... G03B 21/008; G03B 21/28; G03B 21/204; G03B 21/208; G03B 21/2013;
(Continued)

(56) References Cited

U.S. PATENT DOCUMENTS 11,533,459 B2 * 12/2022 Miao ..................... H04N 9/3185
2005/0280850 A1 * 12/2005 Kim ..................... H04N 9/3111
358/1.9

(Continued)

FOREIGN PATENT DOCUMENTS

CN 101452671 6/2009
CN 100579326 1/2010
(Continued)

OTHER PUBLICATIONS

"Office Action of China Counterpart Application", dated Dec. 7, 2023, p. 1-p. 8.

*Primary Examiner* — Sultan Chowdhury
(74) *Attorney, Agent, or Firm* — JCIPRNET (57) ABSTRACT

A projection device, including an illumination system, a control element, a driving element, a light valve, and a projection lens, is provided. The illumination system includes multiple light sources for providing multiple light beams to be combined into an illumination light beam. The driving element respectively drives the light sources in a first mode or a second mode, so that the light beams have respective luminous brightness, and the driving element is switched from the first mode to the second mode according to a first signal. The control element provides the first signal to the driving element according to an optical state or a time state of the projection device. The light valve is adapted to convert the illumination light beam into an image light beam. The projection lens is adapted to project the image light beam out of the projection device.

16 Claims, 7 Drawing Sheets

(58) Field of Classification Search
CPC ............ G03B 21/2033; G03B 21/2053; G03B 21/2066; H04N 9/66; H04N 9/312; H04N 9/315; H04N 9/3155; H04N 9/3158; H04N 9/3161; H04N 9/3164
See application file for complete search history.

(56) References Cited

U.S. PATENT DOCUMENTS

| | | | | |
|---|---|---|---|---|
| 2008/0316377 | A1* | 12/2008 | Chen | H04N 9/3144 349/9 |
| 2009/0141187 | A1* | 6/2009 | Shirai | H04N 9/3114 348/742 |
| 2010/0283921 | A1* | 11/2010 | Li | G03B 21/2033 353/31 |
| 2017/0118452 | A1* | 4/2017 | Ogi | H04N 9/3155 |

FOREIGN PATENT DOCUMENTS

| | | |
|---|---|---|
| CN | 102621785 | 8/2012 |
| CN | 106328088 | 1/2017 |
| CN | 106933015 | 7/2017 |
| CN | 207460393 | 6/2018 |
| CN | 209879242 | 12/2019 |
| JP | 2002207192 | 7/2002 |
| JP | 2004317558 | 11/2004 |
| JP | 2011095291 | 5/2011 |
| JP | 2016057368 | 4/2016 |
| JP | 2016110091 | 6/2016 |
| JP | 2020086460 | 6/2020 |
| KR | 20180018888 | 2/2018 |
| TW | 200731797 | 8/2007 |
| TW | 200850064 | 12/2008 |
| WO | 2019080204 | 5/2019 |

* cited by examiner

PROJECTION DEVICE AND BRIGHTNESS CONTROL METHOD THEREOF

CROSS-REFERENCE TO RELATED APPLICATION

This application claims the priority benefit of China application serial no. 202110398054.8, filed on Apr. 14, 2021. The entirety of the above-mentioned patent application is hereby incorporated by reference herein and made a part of this specification.

BACKGROUND

Technical Field

The invention relates to an electronic device, and particularly relates to a projection device and a brightness control method thereof.

Description of Related Art

Projection device is a display device used to generate large-size images, which has been continuously improved along with evolution and innovation of technology. An imaging principle of the projection device is to convert an illumination light beam generated by an illumination system into an image light beam through a light valve, and then project the image light beam onto a projection target (such as a screen or a wall) through a projection lens to form a projection image.

In addition, along with market's requirements on brightness, color saturation, service life, non-toxic and environmental protection of the projection device, the illumination system has evolved from ultra-high-performance lamps (UHP lamps), light-emitting diodes to the most advanced laser diode (LD) light sources. In a current light combining system, supplementary blue light is used to excite green light in order to increase brightness. However, such approach results a higher overall green energy ratio, and causes a green-biased image. In addition, in order to balance light colors of the illumination system, a red light current and a blue light current are increased to increase a temperature, and the red light is more sensitive to heat, which is likely to cause saturation and reduce the overall conversion efficiency.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The invention is directed to a projection device and a brightness control method thereof, which improve a brightness and color quality of an illumination system.

Other objectives and advantages of the invention may be further illustrated by the technical features broadly embodied and described as follows.

In order to achieve one or a portion of or all of the objectives or other objectives, an embodiment of the invention provides a projection device includes an illumination system, a control element, a driving element, a light valve, and a projection lens. The illumination system includes a plurality of light sources, and the plurality of light sources provide a plurality of light beams for being combined into an illumination light beam. The driving element is coupled to the plurality of light sources. The driving element respectively drives the plurality of light sources in a first mode or a second mode, and the plurality of light beams provided by the plurality of light sources have respective luminous brightness, and the driving element is switched from the first mode to the second mode according to a first signal. The control element is coupled to the driving element, and provides the first signal to the driving element according to an optical state or a time state of the projection device. The light valve is disposed on a transmission path of the illumination light beam to convert the illumination light beam into an image light beam. The projection lens is disposed on a transmission path of the image light beam to project the image light beam out of the projection device.

In order to achieve one or a portion of or all of the objectives or other objectives, an embodiment of the invention provides a brightness control method of a projection device. The projection device includes an illumination system, a control element, a driving element, a light valve, and a projection lens. The brightness control method of the projection device includes the following steps. A plurality of light sources are driven in a first mode or a second mode by the driving element, so that the plurality of light beams provided by the plurality of light sources have respective luminous brightness. A first signal is provided to the driving element by the control element according to an optical state or a time state of the projection device. The first mode is switched to the second mode according to the first signal.

Based on the above description, the embodiments of the invention have at least one of following advantages or effects. In the projection device and the brightness control method thereof of the invention, the driving element drives the plurality of light sources in the first mode or the second mode, so that the plurality of light beams provided by the plurality of light sources have the respective luminous brightness. In addition, the control element provides a signal to the driving element according to an optical state or a time state, and the driving element is switched from the first mode to the second mode according to the signal. Therefore, the driving element may adopt different driving effects to the plurality of light sources. In this way, the problem that the optical effect decays over time is mitigated through switching of a driving mode, so that the projection device may maintain good optical quality, improve the stability of the brightness of the illumination system over time, and reduce a obvious difference caused by the attenuation of the brightness of the illumination system, and improve the stability of the color of the illumination system over time.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
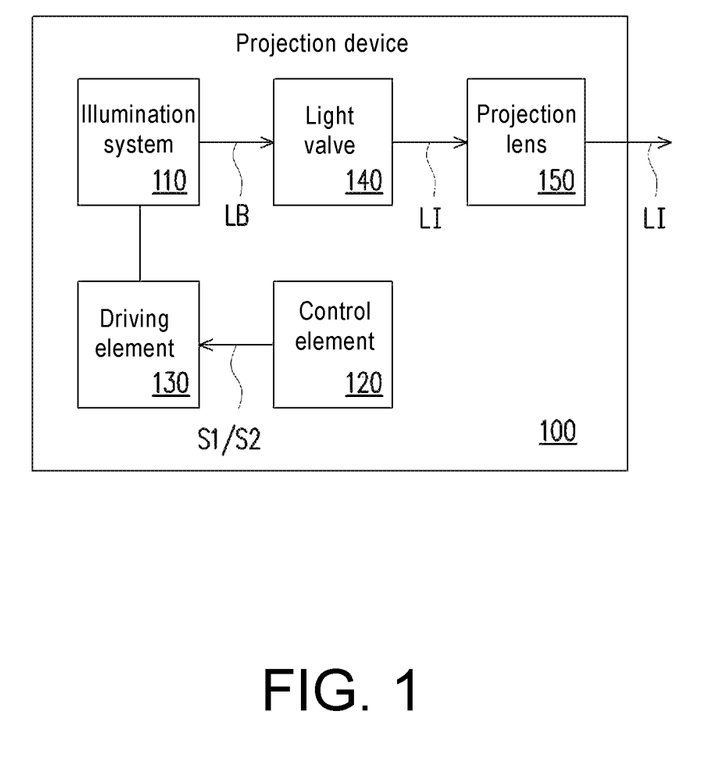
FIG. 1 is a schematic diagram of a projection device according to an embodiment of the invention.

FIG. 1 is a schematic diagram of a projection device according to an embodiment of the invention. Referring to FIG. 1, the embodiment provides a projection device 100, which includes an illumination system 110, a control element 120, a driving element 130, a light valve 140 and a projection lens 150. Where, the illumination system 110 is used to provide an illumination light beam LB. The light valve 140 is disposed on a transmission path of the illumination light beam LB for converting the illumination light beam LB into an image light beam LI. The projection lens 150 is disposed on a transmission path of the image light beam LI, and is used to project the image light beam LI out of the projection device 100 to reach a projection target (not shown), such as a screen or a wall.

The illumination system 110 is, for example, composed of a plurality of light-emitting elements, wavelength conversion elements, light uniformizing elements, filter elements, and/or a plurality of light splitting-combining elements to provide light of different wavelengths as a source of the image light beam. However, the invention does not limit the type or form of the illumination system 110 in the projection device 100, and a detailed structure and implementation thereof will be supplemented in subsequent paragraphs, or sufficient teachings, suggestions and implementation descriptions may be obtained from common knowledge of the art.

The control element 120 is, for example, a central processing unit (CPU), or other programmable general-purpose or special-purpose microprocessor, a digital signal processor (DSP), programmable controller, an application specific integrated circuit (ASIC) or other similar components or a combination of the above components, which is no limited by the invention.

The driving element 130 is, for example, a power supply for a plurality of light-emitting elements in the illumination system 110 or other electronic components that may adjust an electrical performance (such as current, voltage, or power) of the light-emitting elements.

The light valve 140 is, for example, a reflective light modulator such as a liquid crystal on silicon panel (LCoS panel), a digital micro-mirror device (DMD), etc. In some embodiments, the light valve 140 may also be a transmissive light modulator such as a transparent liquid crystal panel, an electro-optical modulator, a magneto-optic modulator, an acousto-optical modulator, etc. The pattern and type of the light valve 140 are not limited by the invention. Regarding detailed steps and implementation of the method that the light valve 140 converts the illumination light beam LB into the image light beam LI, sufficient teaching, suggestion and implementation description thereof may be obtained from the common knowledge in the art, which are not repeated. In the embodiment, the number of the light valve 140 is one, for example, the projection device 100 uses a single digital micro-mirror device, but in other embodiments, the number of the light valves 140 may be more than one, which is not limited by the invention.

The projection lens 150 includes, for example, a combination of one or more optical lenses having refractive powers, such as various combinations of non-planar lenses such as biconcave lenses, biconvex lenses, concavo-convex lenses, convexo-concave lenses, plano-convex lenses, and plano-concave lenses. In an embodiment, the projection lens 150 may further include a planar optical lens to project the image light beam LI coming from the light valve 140 to the projection target in a reflective manner. The pattern and type of the projection lens 150 are not limited by the invention.

Figure 2:
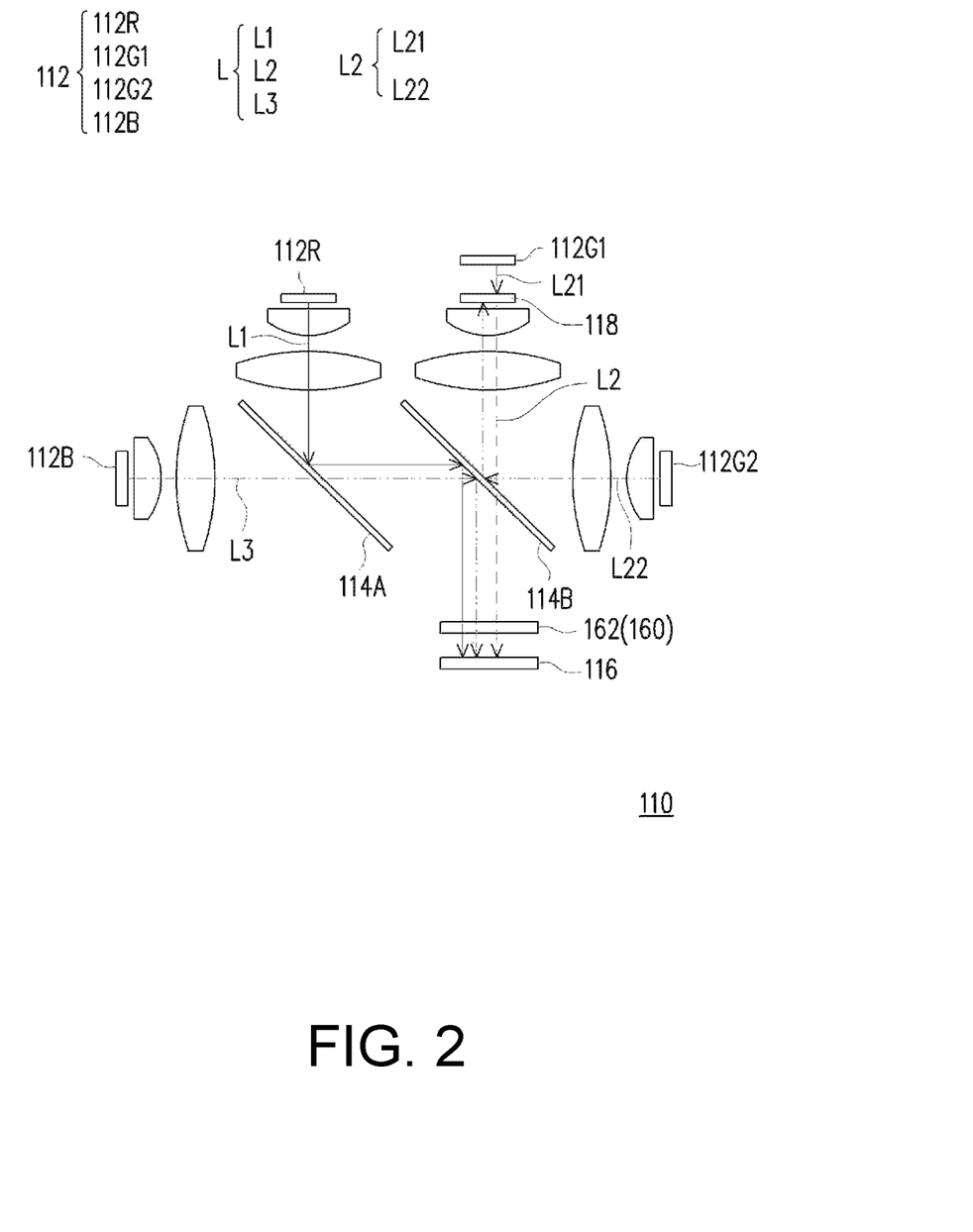
FIG. 2 is a schematic diagram of a part of an illumination system according to an embodiment of the invention.

FIG. 2 is a schematic diagram of an illumination system according to an embodiment of the invention. Referring to FIG. 1 and FIG. 2, for example, the illumination system 110 includes a plurality of light sources 112, and the light sources 112 provide a plurality of light beams L for being combined into an illumination light beam LB. In the embodiment, the illumination system 110 may include a red light source 112R, a first excitation light source 112G1, a second excitation light source 112G2, a blue light source 112B, light splitting elements 114A, 114B, a light uniformizing element 116, and a wavelength conversion element 118. The red light source 112R is used to provide a red light beam L1. The first excitation light source 112G1 is used to provide a blue first excitation light beam L21. The second excitation light source 112G2 is used to provide a blue second excitation light beam L22. The blue light source 112B is used to provide a blue light beam L3. Where, the wavelength conversion element 118 is disposed on a transmission path of the first excitation light beam L21 and the second excitation light beam L22 to perform conversion to obtain a green light beam L2, thereby increasing a luminous intensity of the green light.

The light splitting element 114A is used to reflect the red light beam L1 and allow the blue light beam L3 to pass through. The light splitting element 114B is used to reflect the red light beam L1, the second excitation light beam L22 and the blue light beam L3, and allow the green light beam L2 to pass through. The light uniformizing element 116 is configured to combine the red light beam L1, the green light beam L2, and the blue light beam L3 coming from the light splitting element 114B into an illumination light beam LB. The light uniformizing element 116 is used to adjust a speckle shape of the illumination light beam LB so that the speckle shape of the illumination light beam LB may match a shape (for example, a rectangle) of a working area of the light valve 140, and make the speckle to have the same or close light intensity everywhere to uniformize the light intensity of the illumination beam LB. In the embodiment, the light uniformizing element 116 is, for example, an integrating rod (rod), but in other embodiments, the light uniformizing element 116 may also be other appropriate types of optical elements, such as a lens array (a fly eye lens array), which is not limited by the invention.

The driving element 130 is coupled to the aforementioned the plurality of light sources 112 (i.e., the red light source 112R, the first excitation light source 112G1, the second excitation light source 112G2, and the blue light source 112B), and respectively drive the light sources 112 in a first mode, so that these light sources provide a plurality of light beams having a normal luminous brightness. The control element 120 is coupled to the driving element 130, and provides a first signal S1 to the driving element 130 according to an optical state (such as the luminous brightness of the plurality of light beams L) or a time state (such as an operating time of the plurality of light sources 112) of the projection device 100, and the driving element 130 is switched from the first mode to a second mode according to the first signal S1. In other words, the driving element 130 may respectively drive the light sources 112 in the first mode or the second mode, so that the plurality of light beams L provided by the light sources 112 have respective luminous intensities, so as to maintain a good optical effect.

For example, in the embodiment, when the driving element 130 executes the first mode, the driving element 130 provides an initial power to the plurality of light sources 112. When the driving element 130 executes the second mode, the driving element 130 additionally provides a compensation power to the plurality of light sources 112. However, the invention does not limit detailed electrical parameter configurations of the first mode and the second mode. On the other hand, when the driving element 130 executes the second mode, the control element 120 may continue to provide the first signal S1 or a second signal S2 to the driving element 130 according to the optical state or the time state of the projection device 100. The driving element 130 is switched from the second mode to the first mode according to the second signal S2, but the invention is not limited thereto. Therefore, the driving element 130 may switch a driving mode from the first mode to the second mode according to the first signal S1 provided to the driving element 130 by the control element 120 according to the optical state or the time state of the projection device 100, so as to adopt different driving effects to the plurality of light sources 112. In this way, the problem that the optical effect decays over time may be mitigated through switching of the driving mode, so that the projection device 100 may maintain good optical quality, such as maintaining a brightness or a color of the light source.

In detail, in the embodiment, the control element 120 may have a switching preset value, and when a variation value of the optical state (for example, a variation amount of light intensity attenuation) or a variation value of the time state (for example, a variation amount of an operating time) is greater than the switching preset value, the control element 120 may provide the first signal S1 to the driving element 130. In the embodiment, the aforementioned compensation power is less than 5% of the maximum power of the plurality of light sources 112. In other embodiments, a plurality of switching preset values may be set to increase different switching timings of the driving mode to maintain a good optical effect.

If the optical state is taken as an example for description, in the embodiment, the projection device 100 further includes a sensing module 160, which is disposed on a transmission path of the plurality of light beams L. The sensing module 160 is used for sensing the plurality of light beams L to obtain a sensing signal. The control element 120 receives the sensing signal to obtain an optical state of the projection device 100. To be specific, a position of the sensing module 160 shown in FIG. 2 is only for illustration, in fact, the sensing module 160 is disposed at a position adjacent to the light uniformizing element 116. The sensing module 160 is disposed between the light splitting element 114B and the light uniformizing element 116 to sense a light intensity of the red light beam L1, the green light beam L2 and the blue light beam L3 passing through, and then transmit a sensing signal to the control element 120. In the embodiment, the sensing module 160 includes, for example, a sensing element 162, for example, a photosensitive element such as a charge coupled device (CCD) or a complementary metal oxide semiconductor transistor (CMOS).

However, in other embodiments, the sensing module 160 may include a plurality of sensing elements 162, which are correspondingly disposed to respectively sense the plurality of light beams L. For example, the sensing module 160 may have three sensing elements 162 respectively allocated to the transmission paths corresponding to the red light beam L1, the green light beam L2, and the blue light beam L3 to respectively sense light intensities and a ratio of the red light, the green light and the blue light in the optical system, so that the control element 120 may receive the sensing signals of the different sensing elements 162, and the driving element 130 may respectively perform electrical adjustment on the different light sources 112 according to a current optical effect, but the invention is not limited thereto.

Figure 3:
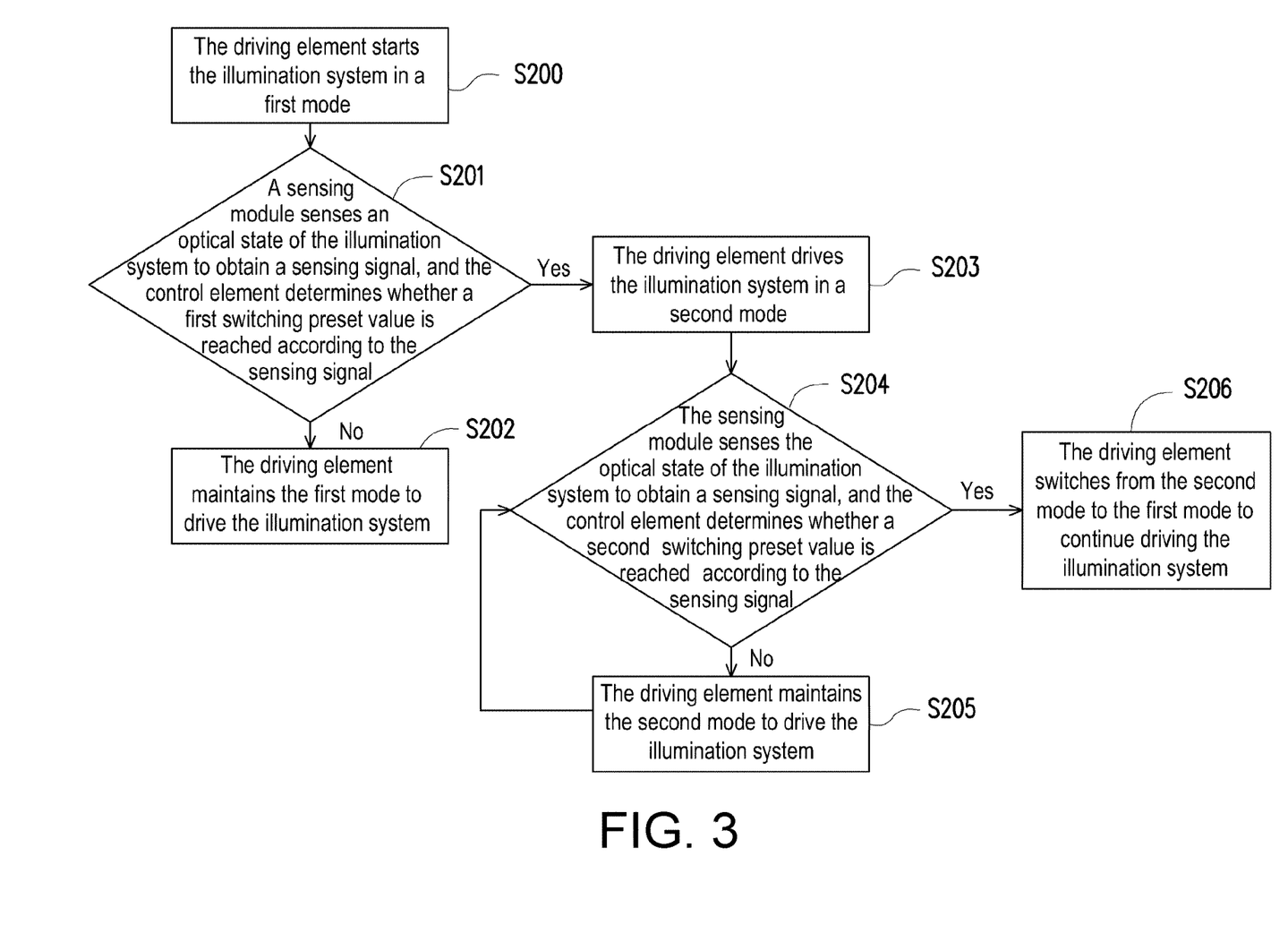
FIG. 3 is a schematic flowchart of a brightness control method of a projection device according to an embodiment of the invention.

FIG. 3 is a schematic flowchart of a brightness control method of a projection device according to an embodiment of the invention. Referring to FIG. 1 to FIG. 3, a step flow shown in FIG. 3 may be at least applied to the projection device 100 shown in FIG. 1 and the illumination system 110 shown in FIG. 2, but the invention is not limited thereto. In the embodiment, in the brightness control method of the projection device 100, step S200 may be first executed, and the driving element 130 starts the illumination system 110 in the first mode (for example, 70% maximum power). Then, step S201 is executed, and the sensing module 160 senses the optical state of the illumination system 110 to obtain a sensing signal, and the control element 120 determines whether a first switching preset value (for example, a light intensity difference of 5%) is reached according to the sensing signal. If the sensing result does not meet the first switching preset value, step S202 is executed, and the driving element 130 maintains the first mode to drive the illumination system 110. If the sensing result meets the first switching preset value, step S203 is executed, and the driving element 130 drives the illumination system 110 in the second mode (for example, adding 3% to 5% power, and not exceeding the maximum power of the light source).

After the above steps are completed, step S204 is executed, the sensing module 160 senses the optical state of the illumination system 110 to obtain a sensing signal, and the control element 120 determines whether a second switching preset value is reached (for example, the light intensity difference is less than 5%) according to the sensing signal. If the sensing result does not meet the second switching preset value, step S205 is executed, and the driving element 130 maintains the second mode to drive the illumination system 110 and repeats step S204 until the second switching preset value is met. If the sensing result meets the second switching preset value, step S206 is executed, and the driving element 130 switches the second mode to the first mode to continue driving the illumination system 110. In an embodiment, the illumination system 110 may store an electrical parameter at this time through a storage element (not shown). The electrical parameter is, for example, a current value for driving the illumination system 110. In the embodiment, the driving element 130 may use the electrical parameter stored in the storage element to drive the illumination system 110 in the first mode. In this way, the problem of optical effect attenuation over time may be mitigated by switching the drive mode, so that the projection device 100 may maintain good optical quality.

Figure 4:
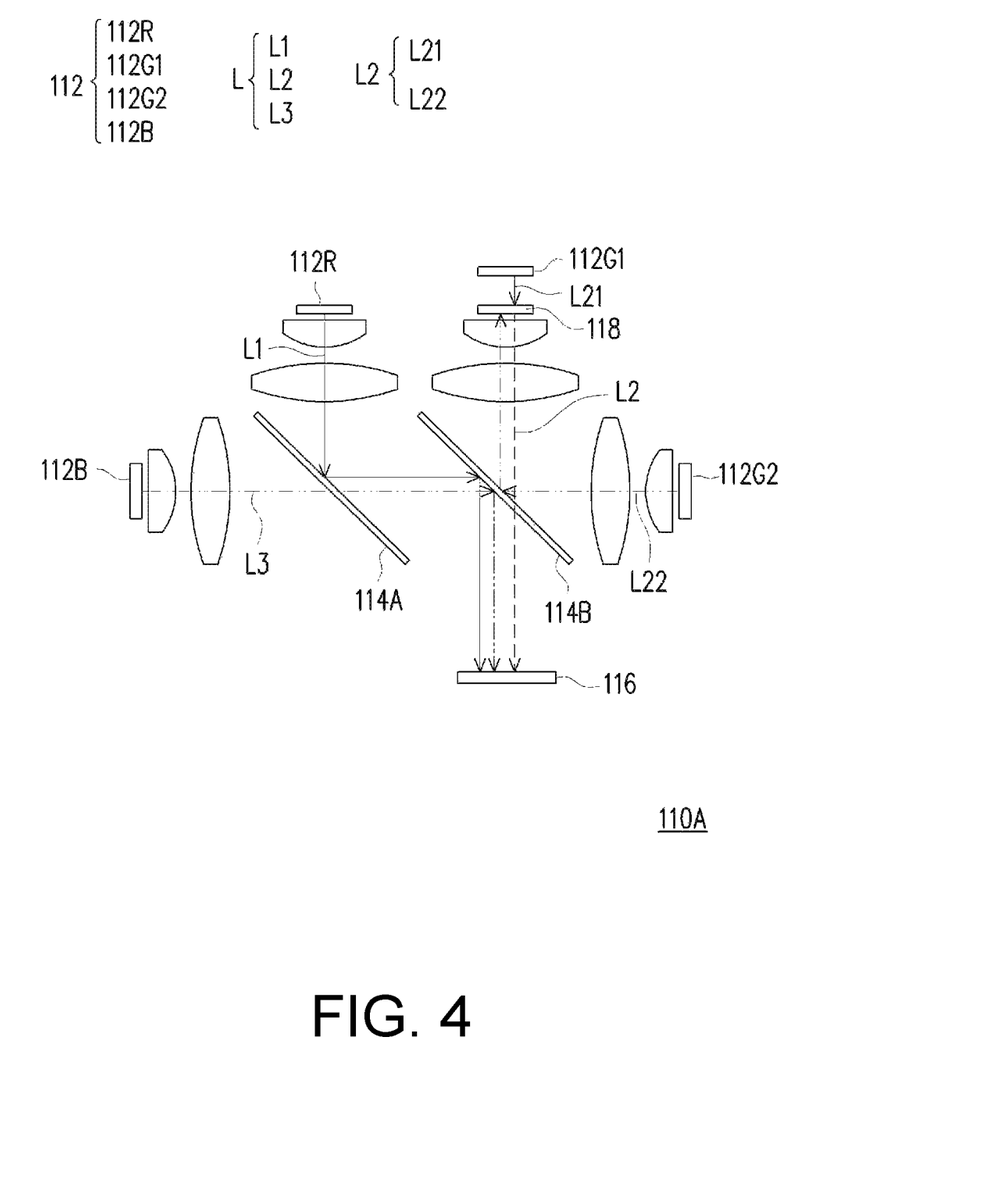
FIG. 4 is a schematic diagram of an illumination system according to another embodiment of the invention.

FIG. 4 is a schematic diagram of an illumination system according to another embodiment of the invention. Referring to FIG. 1 and FIG. 4, the illumination system 110A of the embodiment is similar to the illumination system 110 shown in FIG. 2. A difference there between is that, in this embodiment, the projection device 100 omits the configuration of the sensing module 160 shown in FIG. 2. In addition, the projection device 100 further includes a timing device (not shown), which is coupled to the control element 120. The timing device generates a time signal to the control element 120 according to an operating time of the illumination system 110A, and the control element 120 receives the time signal to obtain the time state of the projection device 100.

Figure 5:
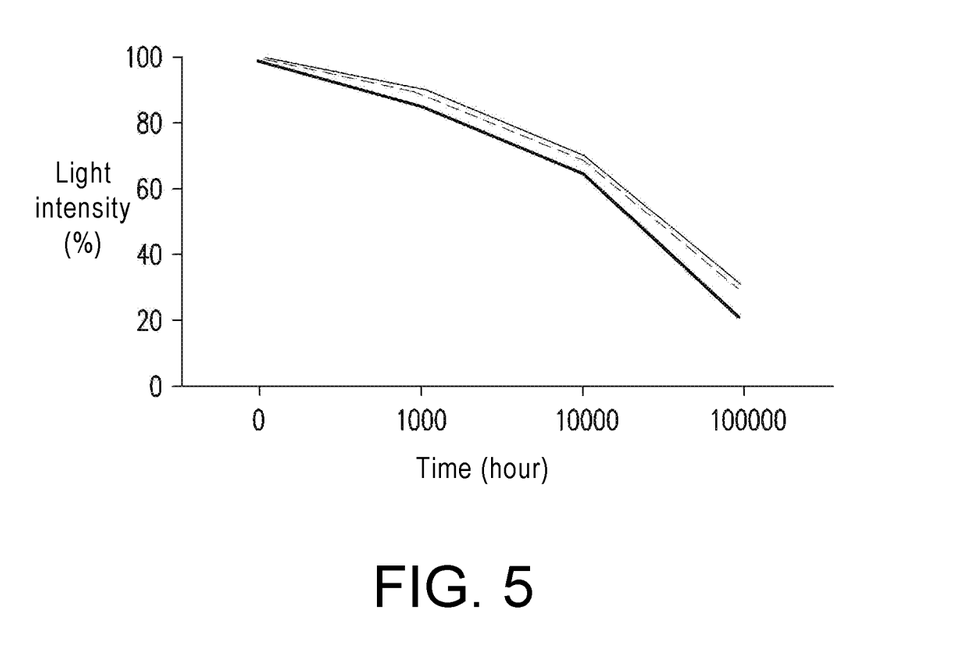
FIG. 5 is a graph showing attenuation curves of multiple light sources in the illumination system of FIG. 4 over time.
Figure 6:
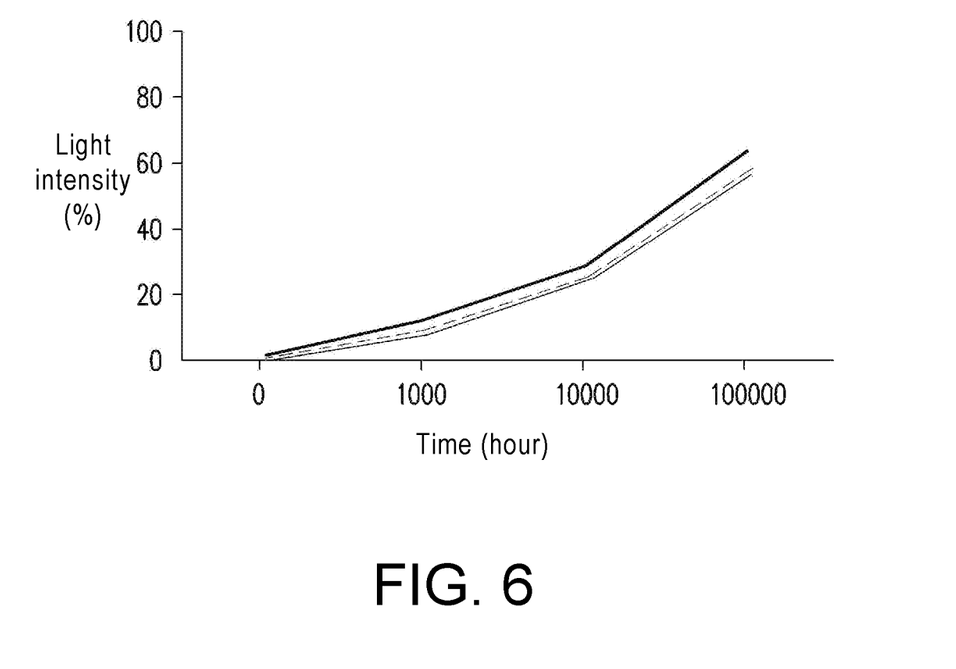
FIG. 6 is a graph showing compensation curves of multiple light sources in the illumination system of FIG. 4 over time.

FIG. 5 is a graph showing attenuation curves of multiple light sources in the illumination system of FIG. 4 over time. FIG. 6 is a graph showing compensation curves of multiple light sources in the illumination system of FIG. 4 over time. Referring to FIG. 1, FIG. 4 to FIG. 6, for example, before the adjustment, a time-to-brightness test may be performed to the multiple light sources 112 in the illumination system 110A in advance to obtain an attenuation curve (i.e., the light intensity that changes over time) of each light source 112, as shown in FIG. 5. Then, a power compensation curve of each light source 112 (i.e., the driving power/light intensity required over time) may be calculated according to the attenuation curves shown in FIG. 5, as shown in FIG. 6. Therefore, the driving element 130 may switch the driving mode from the first mode to the second mode according to the first signal S1 provided to the driving element 130 by the control element 120 according to the time state of the projection device 100, so as to adopt different driving effects to the plurality of light sources 112. In this way, the problem that the optical effect decays over time may be mitigated through switching of the driving mode, so that the projection device 100 may maintain good optical quality. In addition, in the embodiment, the hardware device used for sensing signals may be omitted, which further saves space.

Figure 7:
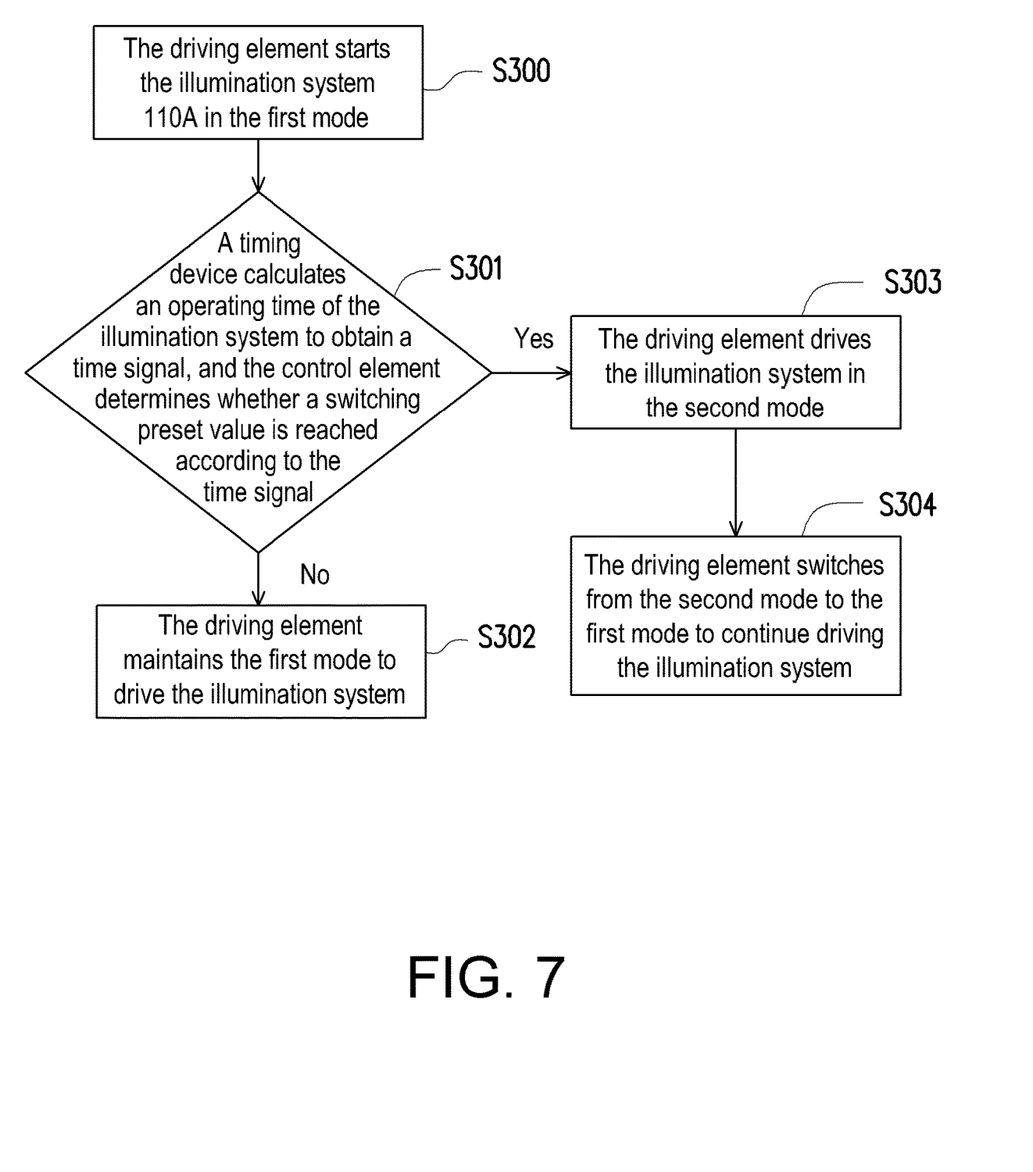
FIG. 7 is a schematic flowchart of a brightness control method of a projection device according to another embodiment of the invention.

FIG. 7 is a schematic flowchart of a brightness control method of a projection device according to another embodiment of the invention. Referring to FIG. 1, FIG. 4 and FIG. 7, a step flow shown in FIG. 7 may be at least applied to the projection device 100 shown in FIG. 1 and the illumination system 110A shown in FIG. 4, but the invention is not limited thereto. In the embodiment, in the brightness control method of the projection device 100, step S300 is first executed, and the driving element 130 starts the illumination system 110A in the first mode. Then, in step S301, a timing device calculates an operating time of the illumination system 110A to obtain a time signal, and the control element 120 determines whether the switching preset value (for example, 1000 hours of operating time) is reached according to the time signal. If the operating time does not meet the switching preset value, step S302 is executed, and the driving element 130 maintains the first mode to drive the illumination system 110A. If the operating time meets the switching preset value, step S303 is executed, and the driving element 130 drives the illumination system 110A in the second mode (for example, adding 3% to 5% power, and not exceeding the maximum power of the light source). After the compensation power is provided, step S304 may be executed, and the driving element 130 switches the second mode to the first mode to continue driving the illumination system 110A. In an embodiment, the illumination system 110A may store an electrical parameter at this time through a storage element (not shown). The electrical parameter is, for example, a current value for driving the illumination system 110A. In the embodiment, the driving element 130 may use the electrical parameter stored in the storage element to drive the illumination system 110A in the first mode. In this way, the problem that the optical effect decays over time can be mitigated by switching the driving mode, so that the projection device 100 may maintain good optical quality.

Figure 8:
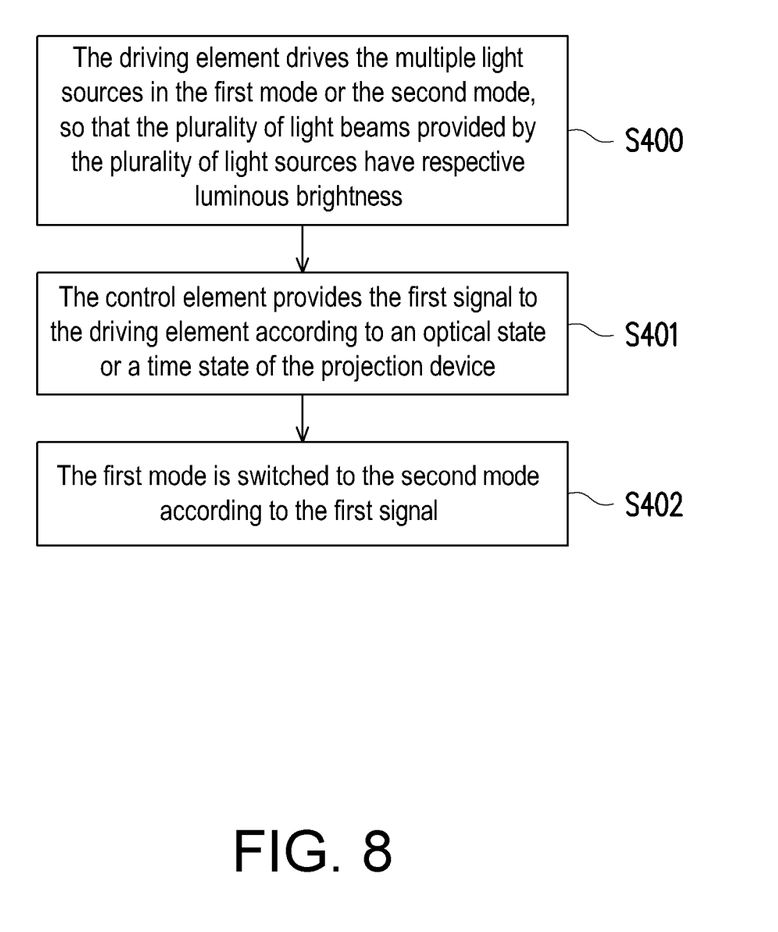
FIG. 8 is a schematic flowchart of a brightness control method of a projection device according to another embodiment of the invention.

FIG. 8 is a schematic flowchart of a brightness control method of a projection device according to another embodiment of the invention. Referring to FIG. 1 and FIG. 8, a step flow shown in FIG. 8 may be at least applied to the projection device 100 shown in FIG. 1, but the invention is not limited thereto. In the embodiment, in the brightness control method of the projection device 100, step S400 may be first executed, and the driving element 130 drives the multiple light sources 112 in the first mode or the second mode (referring to FIG. 2), so that the plurality of light beams L provided by the plurality of light sources 112 have respective luminous brightness. Then, step S401 is executed, and the control element 120 provides the first signal S1 to the driving element 130 according to the optical state or the time state of the projection device 100. Finally, step S402 is executed to switch from the first mode to the second mode according to the first signal.

In summary, in the projection device and the brightness control method thereof of the invention, the driving element drives the plurality of light sources in the first mode or the second mode, so that the plurality of light beams provided by the plurality of light sources have the respective luminous brightness. In addition, the control element provides a signal to the driving element according to an optical state or a time state, and the driving element is switched from the first mode to the second mode according to the signal. Therefore, the driving element may adopt different driving effects to the plurality of light sources. In this way, the problem that the optical effect decays over time is mitigated through switching of the driving mode, so that the projection device may maintain good optical quality, improve the stability of the brightness of the illumination system over time, and reduce the difference caused by the attenuation of the brightness of the illumination system, and improve the stability of the color of the illumination system over time.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims.

What is claimed is:

1. A projection device, comprising an illumination system, a control element, a driving element, a light valve, and a projection lens, wherein
the illumination system comprises a plurality of light sources, and the plurality of light sources provide a plurality of light beams for being combined into an illumination light beam;
the driving element is coupled to the plurality of light sources, the driving element respectively drives the plurality of light sources in a first mode or a second mode, so that the plurality of light beams provided by the plurality of light sources have respective luminous brightness, and the driving element is switched from the first mode to the second mode according to a first signal;
the control element is coupled to the driving element and provides the first signal to the driving element according to an optical state or a time state of the projection device;
the light valve is disposed on a transmission path of the illumination light beam to convert the illumination light beam into an image light beam; and
the projection lens is disposed on a transmission path of the image light beam to project the image light beam out of the projection device.

2. The projection device as claimed in claim 1, wherein the control element has a switching preset value, and when a variation value of the optical state or a variation value of the time state is greater than the switching preset value, the control element provides the first signal.

3. The projection device as claimed in claim 1, wherein the projection device further comprises a sensing module disposed on a transmission path of the plurality of light beams, the sensing module senses the plurality of light beams to obtain a sensing signal, and the control element receives the sensing signal to obtain the optical state.

4. The projection device as claimed in claim 3, wherein the sensing module comprises a plurality of sensing elements, and the plurality of sensing elements are correspondingly configured to sense the plurality of light beams, respectively.

5. The projection device as claimed in claim 1, wherein the projection device further comprises a timing device coupled to the control element, the timing device generates a time signal, and the control element receives the time signal to obtain the time state.

6. The projection device as claimed in claim 1, wherein when the driving element executes the first mode, the driving element provides an initial power to the plurality of light sources, and when the driving element executes the second mode, the driving element additionally provides a compensation power to the plurality of light sources.

7. The projection device as claimed in claim 6, wherein the compensation power is substantially less than 5% of a maximum power of the plurality of light sources.

8. The projection device as claimed in claim 6, wherein when the driving element executes the second mode, the control element provides the first signal or a second signal to the driving element according to the optical state or the time state of the projection device, and the driving element is switched from the second mode to the first mode according to the second signal.

9. A brightness control method of a projection device, wherein the projection device comprises an illumination system, a control element, a driving element, a light valve, and a projection lens, the brightness control method of the projection device comprising:
- driving a plurality of light sources of the illumination system in a first mode or a second mode by the driving element, so that the plurality of light beams provided by the plurality of light sources have respective luminous brightness;
- providing a first signal to the driving element by the control element according to an optical state or a time state of the projection device; and
- switching from the first mode to the second mode according to the first signal.

10. The brightness control method of the projection device as claimed in claim 9, wherein the step of providing the first signal to the driving element by the control element according to the optical state or the time state of the projection device comprises:
- providing the first signal when a variation value of the optical state or a variation value of the time state is greater than a switching preset value.

11. The brightness control method of the projection device as claimed in claim 9, wherein the projection device further comprises a sensing module, the brightness control method of the projection device further comprising:
- sensing the plurality of light beams to obtain a sensing signal; and
- receiving the sensing signal to obtain the optical state.

12. The brightness control method of the projection device as claimed in claim 9, wherein the projection device further comprises a timing device, the brightness control method of the projection device further comprising:
- generating a time signal; and
- receiving the time signal to obtain the time state.

13. The brightness control method of the projection device as claimed in claim 9, wherein the step of driving the plurality of light sources in the first mode or the second mode by the driving element further comprises:
- providing an initial power to the plurality of light sources when executing the first mode; and
- additionally providing a compensation power to the plurality of light sources when executing the second mode.

14. The brightness control method of the projection device as claimed in claim 13, wherein the compensation power is substantially less than 5% of a maximum power of the plurality of light sources.

15. The brightness control method of the projection device as claimed in claim 13, wherein the step of additionally providing the compensation power to the plurality of light sources when executing the second mode further comprises:
- providing the first signal or a second signal to the driving element according to the optical state or the time state of the projection device; and
- switching from the second mode to the first mode according to the second signal.

16. The brightness control method of the projection device as claimed in claim 9, wherein the control element has a switching preset value, and when a variation amount of the sensing result is greater than the switching preset value, the driving element increases brightness of the plurality of light sources to an extend that the variation amount of the sensing result is less than or equal to the switching preset value.

* * * * *